United States Patent [19]

McClain

[11] Patent Number: 4,638,034

[45] Date of Patent: Jan. 20, 1987

[54] PREPARATION OF ETHYLENE-ACRYLIC ACID COPOLYMER OR SALT THEREOF

[75] Inventor: Dorothee M. McClain, Cincinnati, Ohio

[73] Assignee: National Distillers and Chemical Corporation, Va.

[21] Appl. No.: 747,591

[22] Filed: Jun. 24, 1985

[51] Int. Cl.$^4$ .............................................. C08F 8/00
[52] U.S. Cl. .................... 525/369; 525/330.6
[58] Field of Search .......................................... 525/369

[56] References Cited

U.S. PATENT DOCUMENTS

| 2,451,178 | 6/1948 | Semegen | 525/369 |
| 2,865,898 | 12/1958 | Hiatt et al. | 525/369 |
| 3,029,228 | 4/1962 | Glavis | 525/369 |
| 3,547,858 | 12/1970 | Worrall | 525/369 |
| 3,876,452 | 4/1975 | Anspon et al. | 525/369 |
| 3,943,111 | 3/1976 | Fritze et al. | 525/369 |
| 3,970,626 | 7/1976 | Hurst et al. | 525/369 |
| 4,394,483 | 7/1983 | Hobes et al. | 525/369 |

*Primary Examiner*—Joseph L. Schofer
*Assistant Examiner*—Bernard Lipman
*Attorney, Agent, or Firm*—Kenneth D. Tremain

[57] ABSTRACT

Ethylene-acrylic acid copolymers or salts thereof are prepared by first preparing an ethylene-alkyl acrylate copolymer, saponifying such ethylene-alkyl acrylate copolymer in the molten state, in the absence of solvent or water other than by-product alkanol, with selected metal hydroxides to form alkanol and a salt, or an ionomer, of ethylene-acrylic acid copolymer, and optionally acidifying such salt to form ethylene-acrylic acid copolymer.

13 Claims, No Drawings

PREPARATION OF ETHYLENE-ACRYLIC ACID COPOLYMER OR SALT THEREOF

BACKGROUND OF THE INVENTION

1. Field of the Invention

This invention relates to a process for preparing ethylene-acrylic acid copolymers or salts thereof. The ethylene-acrylic acid copolymer is prepared by first preparing an ethylene-alkyl acrylate copolymer, saponifying such ethylene-alkyl acrylate copolymer in the molten state, in the absence of solvent or water other than by-product alkanol, with alkali metal or alkaline earth metal hydroxide to form alkanol and a salt, or an ionomer, of ethylene-acrylic acid copolymer and, optionally, then acidifying such salt to form the ethylene-acrylic acid copolymer.

2. Description of the Prior Art

Ethylene-acrylic acid copolymers may be made directly by copolymerizing ethylene and acrylic acid and salts, or ionomers, of the resulting ethylene-acrylic acid copolymers can then be prepared from such copolymers. However, where the available polymerization reactors and auxiliary equipment are made of carbon steel, the acrylic acid monomer, as well as the ethylene-acrylic acid copolymer made therefrom, may seriously corrode such reactors and equipment. Further, although no such corrosion problems are encountered when copolymerizing ethylene and an alkyl acrylate in carbon steel reactors, it is still necessary to saponify the ethylene-alkyl acrylate copolymers if one wishes to prepare a salt of the ethylene-acrylic compolymer may be prepared. The prior art saponification processes require the use of relatively large amounts of added solvents or water which must be removed from the desired products.

U.S. Pat. No. 3,249,570 discloses a three step process for partially saponifying ethylene-alkyl acrylate copolymers in which the ethylene-alkyl acrylate copolymers are first saponified in a quaternary solvent/water system, then subjected to a pH adjustment step and then recovered by precipitation from an organic liquid non-solvent.

U.S. Pat. No. 3,970,626 discloses a process for saponifying ethylene-alkyl acrylate copolymers in the presence of an aqueous solution of an excess of alkali metal hydroxide. The reaction is conducted at temperatures of at least 180° C. under autogenous pressure in a pressurized reactor.

U.S. Pat. No. 4,307,211 discloses the preparation of selected ethylene-ethyl acrylate-acrylic acid terpolymers by the hydrolysis of ethylene-ethyl acrylate copolymer with water or steam in an inert atmosphere and at temperatures of 150° to 450° C. in a pressurized reactor. The reaction also apparently involves a chain scission of the terpolymer.

U.S. Pat. No. 3,472,825 discloses the preparation of water soluble salts of ethylene-acrylic acid copolymer by neutralizing the copolymers with alkali metals or alkali metal based compounds.

THE OBJECTS OF THE PRESENT INVENTION

An object of the present invention is to produce ethylene-acrylic acid copolymers without having to use acidic moieties, monomeric or polymeric, in a polymerization reactor constructed of carbon steel.

A further object of the present invention is to produce an ethylene-acrylic acid copolymer from an ethylene-alkyl acrylate copolymer without having to add water or organic solvents to the reaction system.

A further object of the present invention is to provide a process for producing ethylene-acrylic acid copolymer from an ethylene-alkyl acrylate copolymer without having to recover or remove large amounts of water or added solvent from the reaction system.

A still further object of the present invention is to provide a process for producing an ethylene-acrylic acid copolymer from an ethylene-alkyl acrylate copolymer in which the alkanol by-product of the saponification step is recovered in a substantially pure state without the need to purify it from water or organic solvents.

SUMMARY OF THE INVENTION

It has now been found that ethylene-acrylic acid copolymers, or salts thereof, can be prepared without causing any corrosion in the polymerization reactors by the use of acid moieties therein, or without the need for employing added water or solvent during any of the reaction steps, by first preparing an ethylene-alkyl acrylate copolymer in the polymerization reactor, then saponifying such copolymer in the molten state, in the absence of solvent or water other than by-product alkanol, with alkali metal or alkaline earth metal hydroxide to form alkanol and polymeric salts, or ionomers, of ethylene-acrylic acid copolymer, and, optionally, then acidifying such salts to form ethylene-acrylic acid copolymer as, for example, by treatment with aqueous acid.

The ethylene-alkyl acrylate copolymers which are employed in the process of the present invention may be prepared by conventional processes, such as by the high pressure copolymerization of ethylene and alkyl acrylate in the presence of free radical catalysts. Such reactions can be accomplished in polymerization reactors made of carbon steel without any significant corrosion occuring therein due to acidic moieties supplied by the polymerizable monomers, or the resulting polymer.

These ethylene-alkyl acrylate copolymers will have an ethylene content of about 10 to 90 weight percent and an alkyl acrylate content of about 90 to 10 weight percent. The preferred ethylene content is 50–80 weight percent, and the preferred acrylate ester content is 20–50 weight percent in these copolymers. They will have a melt index (ASTM D1238 Condition E) of about 1 to 500 grams per 10 minutes. They may be random or block copolymers.

The acrylate ester to be used in these copolymers is an ester of a $C_1$ to $C_8$ saturated, branched or linear, primary or secondary alkanol. A linear alkanol with from 1 to 4 carbon atoms is preferred. Examples of these acrylate esters are: methyl acrylate, n-propyl acrylate and n-butyl acrylate.

The alkanol formed during the saponification reaction described herein corresponds to the alcohol moiety portion of the acrylate ester of the copolymer used in the saponification reaction.

The alkali metal and alkaline earth metal hydroxides that are used in the process of the present invention include NaOH, LiOH, KOH, RbOH, CsOH, $Ca(OH)_2$, $Sr(OH)_2$ and $Ba(OH)_2$. These hydroxides may be used individually or in various combinations thereof. To facilitate their dispersement in the ethylene-methyl acrylate copolymer, the hydroxides are preferably used in the form of powders or small pellets.

The hydroxides are used in no more than about 25% above the stoichiometric amount needed to achieve the desired level of either a partial or complete saponification of the ester groups in the ethylene-alkyl acrylate copolymers. Where the saponification is complete, all the pendant alkyl acrylate groups in the copolymers will be converted to pendant salts of acrylic acid. Where the ethylene-alkyl acrylate copolymer is only partially saponified, the resulting product will be a terpolymer containing interpolymerized ethylene, alkyl acrylate and acrylic acid salt moieties.

No water or solvent is added to the saponification reaction. The by-product alkanol that results from the saponification reactor can be readily removed from the reaction system by vaporization and recovered if desired.

The saponification reaction is conducted at a temperature of about 30° to 300° C. This reaction can be conducted at atmospheric pressure in any type of mixing device commonly employed in the art of mixing molten polymer materials such as twin screw extruders, Banbury mixers or multiroll mills. The reaction may be conducted under air or under an inert atmosphere. An inert atmosphere (nitrogen, argon, etc) is often preferred.

The acrylic acid salt moieties in the saponified copolymers may then be completely or partially acidified to form ethylene-acrylic acid moieties in the polymer. Depending on the degree of saponification and acidification that is conducted in each of such steps, the final polymer product may contain only interpolymerized ethylene and acrylic acid moieties, or it may contain ethylene and acrylic moieties as well as some alkyl acrylate and/or acrylic acid salt moieties.

The acidification reaction is conducted at a temperature of about 30° to 200° C. This reaction can be conducted in an aqueous dispersion containing sufficient acid to acidify any desired portion of the acrylic acid salt moieties present in the saponified polymer.

The acid employed may be an inorganic acid such as sulfuric acid, phosphoric acid or hydrochloric acid, or an organic acid such as acetic acid. It is advantageous, in order to achieve good contact of the acid solution with the polymer, to perform the acidification under conditions of good agitation, as in dispersion devices, kneaders, on multiroll mills, in continuous processors, twin screw extruder, etc. Care is taken to add only enough acid to obtain the desired degree of acidification of the polymer, and the use of excess of such acid is neither necessary nor desired. Since the saponified polymers are themselves slightly alkaline materials, the acidification operation can be accomplished under conditions of no or low acidity, up until the point where the final acidified polymer is isolated, dried and further processed, e.g., made into pellets. It is only in this final stage that possible acid corrosion by the acrylic acid-containing polymer must be taken into consideration.

Alternatively, it is often suitable and convenient to perform the polymer acidification step in a suitable solvent, e.g., in a dipolar aprotic solvent such as dimethylformamide, dimethylacetamide, dimethylsulfoxide, N-methylpyrrolidone, tetrahydrofuran or in a mixed solvent comprising one of the aforesaid dipolar, aprotic solvents with a hydrocarbon solvent such as a linear hydrocarbon or alicyclic hydrocarbon or an aromatic hydrocarbon exemplified by such solvents as hexane, heptane, cyclohexane, decalin, toluene, xylene, etc.

EXAMPLE 1

Four eight hundred gram charges (Charges A, B, C and D) of ethylene-methyl acrylate (EMA) copolymer (Gulf EMA 2205, nominal methyl acrylate content, 20% by weight) were separately milled on a two-roll mill with enough dry powdered sodium hydroxide calculated to effect, respectively, one-half (Charges A and C) and complete (Charges B and D) saponification of the contained 20 weight percent (nominal) of copolymerized methyl acrylate units. The EMA copolymer used for the experiments had a measured melt flow rate of 2.4 g/10 minutes (ASTM D 1238, Cond. E). The molten mixture was first milled at 230° F. for 18 minutes and a sample was removed for determination of the degree of saponification. Thereafter, the milling was continued for 60 minutes more at 300°-310° F. and the product was again analyzed for degree of saponification. In several experiments (Charges E, F and G), 100 gr of the initial milled mixtures (of charges A, B and B, respectively) were further heated at 150°-200° C. in a forced-air oven, in an effort to effect saponification under static conditions. In certain other experiments, a small amount of water (in charges DD), sometimes containing Pluronic F 98 (BASF Wyandotte Corp., ethylene glycol-propylene glycol copolymer) as a surfactant (in Charges CCC and DDD) was added and the milling was continued. The results of these experiments are shown in Table I.

The methyl alcohol found during the saponification reactions readily removed itself from the reaction systems by freely dissipating into the atmosphere.

The products of saponification of the above experiments were purified and acidified in the following manner: a small sample, usually 10 g, of the material was dissolved in tetrahydrofuran containing, in addition to a little water, enough glacial acetic acid to neutralize all the alkali the sample would have contained if none had reacted. Under these conditions the sample was soluble and in its acid form. It was then precipitated with methanol. It was washed with methanol three times by decantation and dried.

The degree of saponification of each of the purified, dried polymers was determined as follows: a weighed specimen of approximately 0.5 g. was dissolved in a hot mixture (above 70° C.) of 80 g of decalin and 56 g of dimethylacetamide and titrated with a standardized 0.02N methanolic KOH solution to the phenolphthalein endpoint. Under these conditions, no separation of solid material from the solution was observed. A blank titraton was also done on a mixture of the two solvents. The results are shown in Table 1 in terms of weight percent hydrolysis of the methyl acrylate contained in the EMA copolymer.

TABLE I

Conditions and Results of Example 1
Saponification of Ethylene-Methyl Acrylate (EMA) Copolymer Resin

| Charge No. | Charge components | | | Conditions | | Purified Product | | Remarks |
|---|---|---|---|---|---|---|---|---|
| | Resin | NaOH, g | Other | Temperature | Time, Min. | Wt. % Hydrolysis | % Na[1] | |
| (Charge milled on a 2-roll mill) | | | | | | | | |
| A | 800 g EMA | 37.2 | — | 230° F. | 18 | 7.2* | 0.05 | |
| AA | ½ Product of A | — | — | 300° F. | 60 | 10.7* | — | |
| B | 800 g EMA | 74.4 | — | 230° F. | 18 | 13 | 0.03 | |
| BB | ½ Product of B | — | — | 300° F. | 60 | 45.5 | — | 2 |
| C | 800 g EMA | 37.2 | — | 230° F. | 18 | 9.2 | — | |
| CC | ½ Product of C | — | — | 300° F. | 60 | 33.9 | 1.05 | |
| CCC | ½ Product of C | — | 4 g Pluronic F-98 + 2 ml H$_2$O | 300° F. | 60 | 16.2 | — | 3 |
| D | 800 g EMA | 74.4 | — | 230° F. | 18 | 14.3 | — | |
| DD | ½ Product of D | — | 6 ml H$_2$O | 310° F. | 60 | 45.7 | — | |
| DDD | ½ Product of D | — | 4 g Pluronic F-98 + 2 ml H$_2$O | 300° F. | 60 | 19.8 | — | 3 |
| (Charge heated in Circulating Air Oven) | | | | | | | | |
| E | 100 g Product of A | — | — | 150° C. | 60 | 6.8 | — | |
| F | 100 g Product of B | — | — | 150° C. | 60 | 13.7 | — | |
| G | 100 g Product of B | — | — | 200° C. | 60 | 14.3 | — | |

[1]determined by atomic absorption
[2]Material falling off mill during milling was returned to top of rolls during the milling of Charges BB and DD
[3]The products formed from charges CCC and DDD had a green discoloration
*average of 2 analysis

EXAMPLE 2

A 100-g portion of the EMA copolymer of Example 1 containing 0.23 mole of methyl acrylate (calculated) was mixed with 10.5 g (0.26 mole) of sodium hydroxide beads (PELS, PPG Industries) for about 10 minutes on a 2-roll rubber mill pre-set at 150° C., employing a tight nip to crush the sodium hydroxide beads. Thereafter 40 g of the resulting mixture was transferred to a Brabender Plasticorder (roller blade) at a pre-set temperature of 150° C., with the roller blade rotating at 50 rpm. A torque increase set in, indicating reaction. As the torque increased, the temperature was also increased to keep the mixture molten. At 313° C. and a torque of 8000 meter-grams the mixer shear pin broke. The product was removed immediately.

The methyl alcohol formed during the saponification reaction readily removed itself from the reaction system by freely dissipating into the atmosphere.

The saponified product was purified and acidified as described in Example 1. Duplicate specimens were analyzed for weight percent hydrolysis as described in Example 1 and gave values of 78.1% and 79.0%.

What is claimed is:

1. A process for preparing an ethylene-acrylic acid copolymer salt which comprises saponifying an ethylene-alkyl acrylate copolymer in the molten state, in the absence of solvent or water other than by-product alkanol, with alkali metal hydroxide or alkaline earth metal hydroxide under non-static mixing conditions so as to thereby form alkanol and an alkali metal or alkaline earth metal salt of ethylene-acrylic acid copolymer, and separately recovering said alkanol and said salt.

2. A process as in claim 1 in which said saponifying is conducted at a temperature of 30°–300° C. at atmospheric pressure.

3. A process as in claim 1 in which said salt is, subsequently, at least partially acidifed.

4. A process as in claim 3 in which the acidification is carried out in a solvent comprising dipolar aprotic solvent.

5. A process for preparing an ethylene acrylic acid copolymer salt which comprises first forming an ethylene-alkyl acrylate copolymer and then saponifying said copolymer in the molten state, in the absence of solvent or water other than by-product alkanol, with alkali metal hydroxide or alkaline earth metal hydroxide under non-static mixing conditions so as to thereby form alkanol and an alkali metal or alkaline earth metal salt of ethylene acrylic acid copolymer, and separately recovering said alkanol and said salt.

6. A process as in claim 5 in which said saponifying is conducted at a temperature of 30°–300° C. at atmospheric pressure.

7. A process as in claim 5 in which said salt is, subsequently, at least partially acidified.

8. A process as in claim 5 in which said ethylene-alkyl acrylate copolymer is formed in a reactor made of carbon steel.

9. A process as in claim 7 in which the acidification is carried out in a solvent comprising dipolar aprotic solvent.

10. A process as in claim 1 in which said hydroxide is used in an amount which is up to 25% more than the stoichiometric amount thereof needed to effect the desired level of saponification of said copolymer.

11. A process as in claim 1 in which said amount is 50 to 100% of the calculated amount of hydroxide needed to effect complete saponification of said copolymer.

12. A process as in claim 1 in which said saponification process is conducted so as to achieve a level of saponification of up to 79%.

13. A process as in claim 12 in which said saponification process is conducted so as to achieve a level of saponification of up to about 45%.

* * * * *